Patented Mar. 1, 1927.

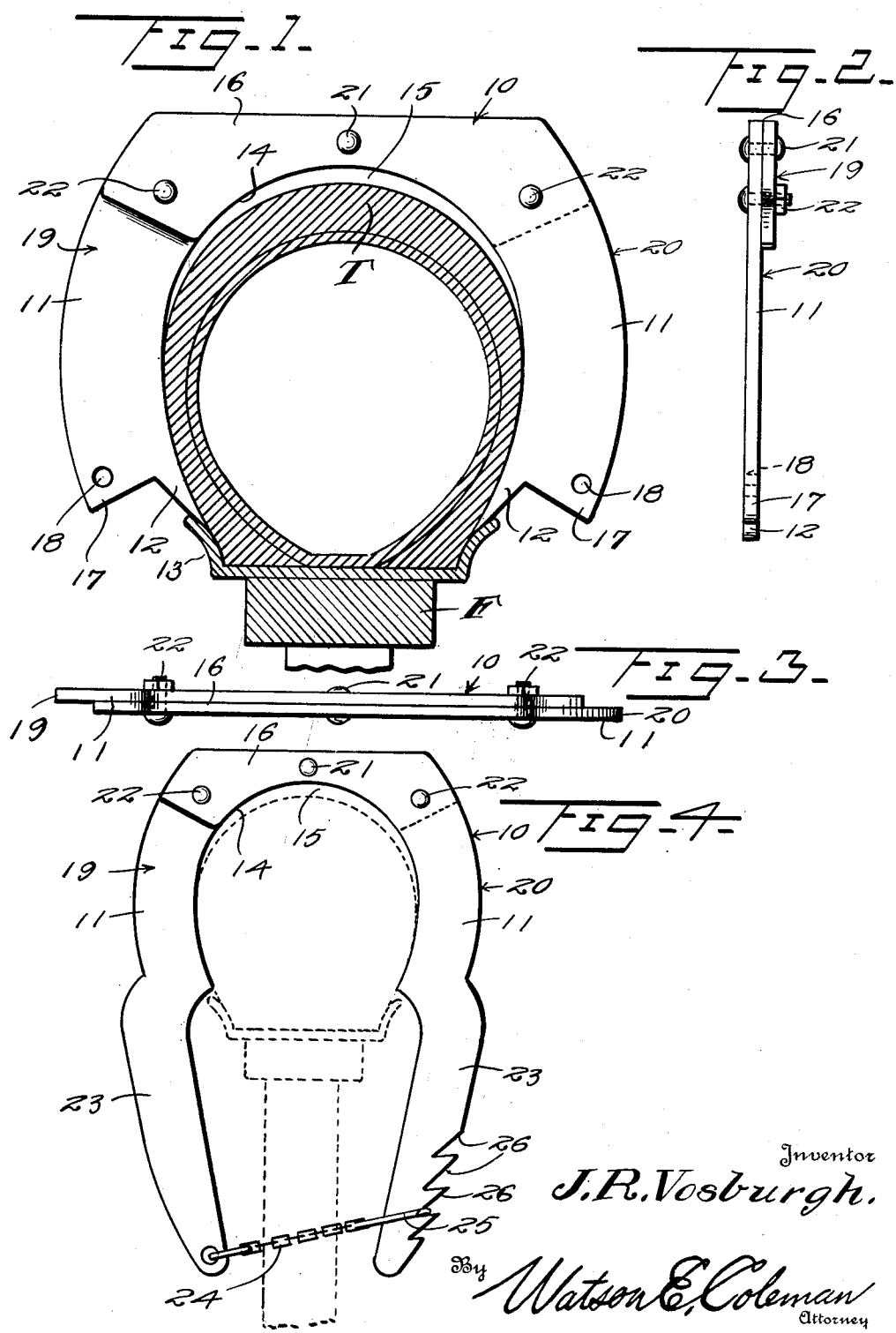

1,619,170

UNITED STATES PATENT OFFICE.

JOHN R. VOSBURGH, OF JOHNSTOWN, NEW YORK.

TRACTION DEVICE FOR VEHICLE TIRES.

Application filed May 13, 1926. Serial No. 108,887.

This invention relates to traction devices for vehicle tires and more particularly to a device of this character, one or more of which may be applied to the tire in order to enable the vehicle to proceed over muddy or slippery ground.

An important object of the invention is to provide a device of this character of such construction that the transmission of shocks and jars to the vehicle, due to a tendency on the part of the traction device to check rotation of the wheel, is reduced to a minimum and in which the tire acts as a bumper partially absorbing such shocks.

A further object of the invention is to produce a device of this character which may be very readily attached to the tire of a vehicle wheel without having any actual connection to the wheel proper.

A still further object of the invenion is to provide a device which may be employed with equal facility upon the tires of either disk or spoke wheels.

These and other objects I attain by the construction shown in the accompanying drawings, wherein for the purpose of illustration is shown a preferred embodiment of my invention and wherein:—

Figure 1 is a sectional view through a tire having applied thereto a traction device constructed in accordance with my invention;

Figure 2 is a side elevation of the traction device;

Figure 3 is a plan view thereof;

Figure 4 is a front elevation of a similar modified traction device.

Referring now more particularly to the drawings, the numeral 10 generally designates a substantially U-shaped traction device adapted to seat and fit upon the vehicle tire. The ends of the arms 11 converge slightly toward their free ends, so that the contour of the tire is closely followed and portions 12 are provided which may engage against the rim 13 of the tire and extend partially between the rim and the adjacent face of the tire. At the bight portion, the opening 14 provided between the arms is somewhat elongated, so that when the traction device is radially disposed to the tire, a space 15 appears between the bight portion and the tread T of the tire. This enables the traction device to incline upon the tire, without regard to the direction of rotation of the wheel, so that the bight portion 16 thereof trails with respect to the free ends 12 of the arms. These free ends are provided with means, as lugs 17, having openings 18 formed therein, whereby a connection may be made between the ends of the arms and around the felly F of the wheel, if so desired, although this connection is unnecessary.

In the construction of the U-shaped member, it is preferably produced in two sections 19 and 20, each section bearing one arm 11 and having an angular portion which overlaps the angular portion of the other section. Through these overlapped portions, which combine to form the bight 16 of the U, and at the center thereof, a pivot 21 is disposed, preferably in the form of a rivet. At opposite sides of the pivot, these sections are formed with openings, for the passage of securing elements 22 whereby the sections may be secured in assembled relation and prevented from rotating about the pivot thereof. By removing the securing elements 22, the devices may be swung about their pivots to permit their ready application to the tire.

It is pointed out that when the arms 11 of the U are separated to permit the tire to be inserted therebetween, the free ends of the angular portions will extend into the opening 14, so that they engage with the tire, causing the sections to swing to their closed position, as the device is applied.

In the form shown in Figure 4, the arms 11 are provided with extensions 23 which are of sufficient length to project inwardly beyond the inner face of the felly of the wheel and are sufficiently spaced apart at their free ends to accommodate therebetween the disks of a disk wheel. Where the device is employed upon a disk wheel, no connection is provided between these extensions, but if employed on a spoke wheel, a chain 24 connected at one end to one of the extensions is provided and has at its free end a link 25 for selective engagement with teeth 26 carried by the other arm and made of different depths, so that the tension placed against the ends of the extensions may be regulated.

It will, of course, be obvious that where these extensions are provided, the securing elements 22 may be omitted, if desired. This is particularly advantageous where the devices are to be employed momentarily, as in extracting the vehicle from a mud-hole.

Since the constructions hereinbefore set forth are obviously capable of a certain range of change and modification without materially departing from the spirit of the invention, I do not limit myself to such specific structures except as hereinafter claimed.

I claim:—

A traction device for tired vehicle wheels comprising a U-shaped member adapted to straddle the tire and having the ends of its arms converging to fit against the side walls of the tire adjacent the rim, the opening between the arms being elongated at the bight to provide a space between the tread of the tire and the confronting face of the bight portion when the device is disposed radially to the tire.

In testimony whereof I hereunto affix my signature.

JOHN R. VOSBURGH.